United States Patent
Le Lannic et al.

(10) Patent No.: US 9,550,946 B2
(45) Date of Patent: Jan. 24, 2017

(54) PURGE/SAMPLING SYSTEM FOR A VESSEL, THE CORRESPONDING VESSEL AND CLEANING METHOD USING SAID PURGE/SAMPLING SYSTEM

(75) Inventors: Katell Le Lannic, Le Havre (FR); Xavier Mourain, Lillebonne (FR); Maxime Varin, Saint Vigor d'Ymonville (FR)

(73) Assignee: TOTAL RAFFINAGE FRANCE, Courbevoie (FR)

( * ) Notice: Subject to any disclaimer, the term of this patent is extended or adjusted under 35 U.S.C. 154(b) by 750 days.

(21) Appl. No.: 13/992,455

(22) PCT Filed: Dec. 23, 2011

(86) PCT No.: PCT/EP2011/073942
§ 371 (c)(1),
(2), (4) Date: Aug. 12, 2013

(87) PCT Pub. No.: WO2012/089662
PCT Pub. Date: Jul. 5, 2012

(65) Prior Publication Data
US 2013/0313163 A1 Nov. 28, 2013

(30) Foreign Application Priority Data
Dec. 27, 2010 (EP) .................................. 10306518

(51) Int. Cl.
*G01N 1/10* (2006.01)
*C10G 47/26* (2006.01)
(Continued)

(52) U.S. Cl.
CPC .............. *C10G 47/26* (2013.01); *B01J 4/001* (2013.01); *B01J 4/008* (2013.01); *B01J 8/0035* (2013.01);
(Continued)

(58) Field of Classification Search
None
See application file for complete search history.

(56) References Cited

U.S. PATENT DOCUMENTS

| 2007/0036693 A1* | 2/2007 | Vandaele ............. B01J 19/0033 422/131 |
| 2010/0056707 A1 | 3/2010 | Hottovy et al. |
| 2011/0230627 A1* | 9/2011 | Tanghe .................... B01J 8/002 526/60 |

FOREIGN PATENT DOCUMENTS

| WO | 01/05842 A1 | 1/2001 |
| WO | 2010/057925 A1 | 5/2010 |

OTHER PUBLICATIONS

International Search Report of PCT/EP2011/073942 dated Feb. 17, 2012.

* cited by examiner

*Primary Examiner* — Robert R Raevis
(74) *Attorney, Agent, or Firm* — Sughrue Mion, PLLC

(57) ABSTRACT

The invention concerns a purge/sampling system for vessels, particularly for high temperature, high pressure vessels such as hydroconversion reactors used in refinery processes and operated in severe conditions.
Such purge/sampling system comprises a purge/sampling line (16) equipped with a connector designed to be connected to the vessel (10), a first (18 and a second (20) flow regulation systems mounted in series on the purge/sampling line, wherein at least one injection line (22) is connected to the purge/sampling line between the first and the second flow regulation systems, said injection line comprising connecting means to a source of cleaning fluid (24) and at least one flow regulation device to control the flow of cleaning fluid through injection line and purge/sampling line (Continued)

The invention also concerns a vessel equipped with such a purge/sampling system, as well as a cleaning method using said purge/sampling system.

25 Claims, 1 Drawing Sheet

(51) Int. Cl.
*B01J 4/00* (2006.01)
*B01J 8/00* (2006.01)
*B01J 8/22* (2006.01)
*C10G 49/12* (2006.01)

(52) U.S. Cl.
CPC .................. *B01J 8/22* (2013.01); *C10G 49/12* (2013.01); *B01J 2204/005* (2013.01); *B01J 2208/00761* (2013.01); *B01J 2208/00769* (2013.01); *Y10T 137/0318* (2015.04); *Y10T 137/8376* (2015.04)

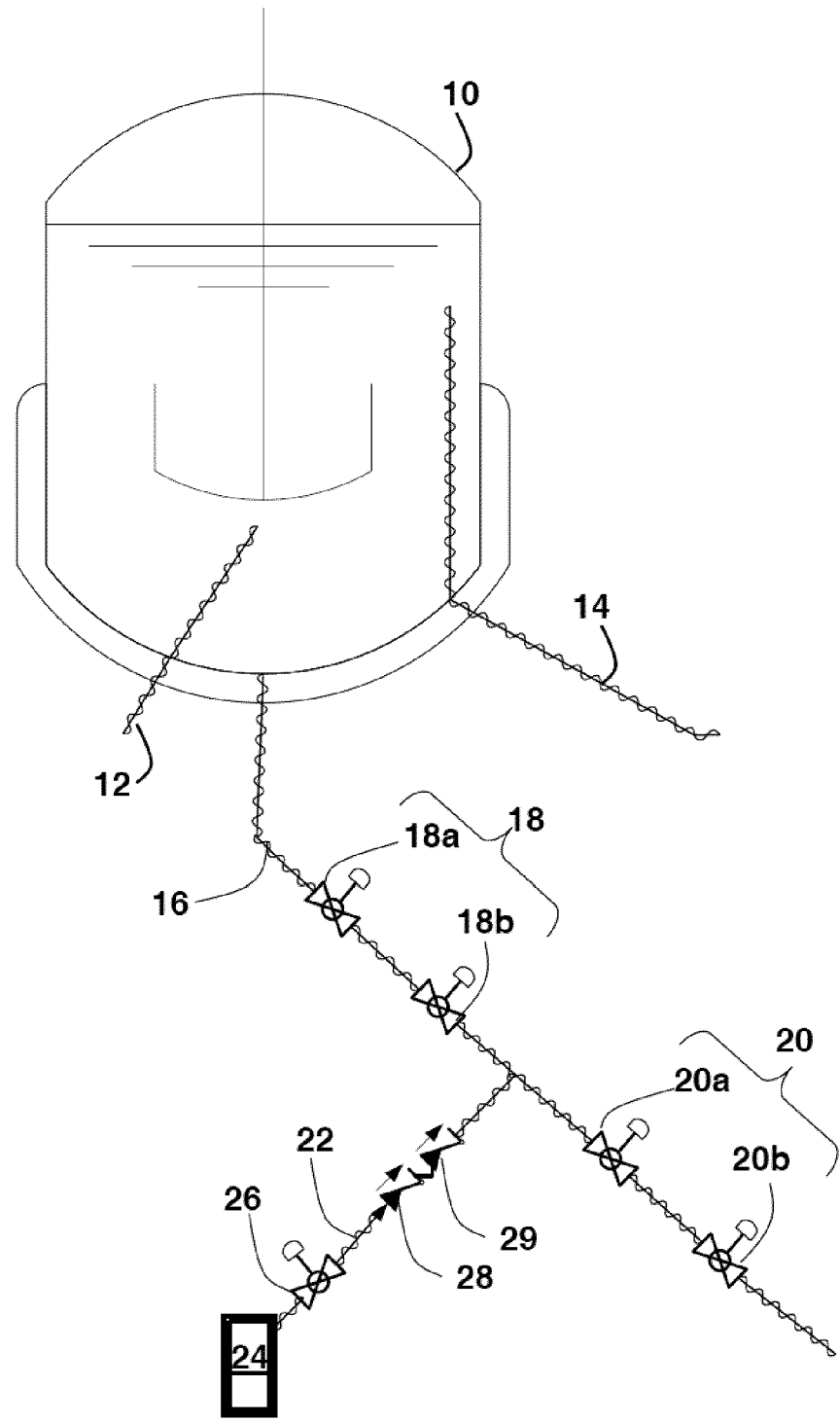

PURGE/SAMPLING SYSTEM FOR A VESSEL, THE CORRESPONDING VESSEL AND CLEANING METHOD USING SAID PURGE/SAMPLING SYSTEM

CROSS REFERENCE TO RELATED APPLICATIONS

This is a National Stage of International Application No. PCT/EP2011/073942 filed Dec. 23, 2011, claiming priority based on European Patent Application No. 10 306 518.1 filed Dec. 27, 2010, the contents of all of which are incorporated herein by reference in their entirety.

The instant invention concerns a purge/sampling system for vessels, particularly for (i) high temperature, high pressure vessels such as hydroconversion reactors used in refinery processes and operated in severe conditions, as for example hydrocarbon processing slurry reactors and (ii) solids unloading from vessels, e.g. solid catalysts, solid adsorbents, solid guard beds.

The invention also concerns a vessel equipped with such a purge/sampling system, as well as a cleaning method using said purge/sampling system.

High temperature, high pressure vessels such as hydroconversion reactors used in refinery processes, and more particularly hydrocarbon processing slurry reactors, are generally operated in severe conditions, at temperature ranges from 360 to 480° C., preferably from 380 to 440°, and under a pressure of 50 to 300 bars, preferably from 100 to 200 bars.

Such hydroconversion reactors can be operated upflow or downflow. These reactors are preferably perfectly stirred reactors (CTSR).

Slurry reactors are typically used in hydrocarbon refining processes for the treatment of heavy residues such as conventional vacuum distillation residue (VR) or vacuum visbroken residues (VVR).

Most of hydroconversion reactors present at their bottom a purge/sampling system. This purge/sampling system is most often used for sampling the product contained in the reactor during operation, for example to check its composition. The purge/sampling system can also be used to purge the bottom product of the reactor, during or after operation.

Usual purge/sampling systems of high temperature, high pressure vessels or reactors comprise a purge/sampling line connected to the bottom of the vessel or reactor and equipped with two valves mounted in series, generally two-way control valves. However, the purge or sampling remains a dangerous operation due to the risk of depressurization of the vessel and risk of burning for the operators.

Moreover, under some operating conditions, finely divided particles are formed and/or accumulated at the bottom of the vessel, and may block or damage the valves of the purge/sampling system, which may be particularly detrimental to tightness of the purge/sampling system and security of operators. In particular, when fluids treated in the vessel contain particles, an important abrasive effect is observed on the pieces of the installation, especially on moving parts as those that can be found in valves. Such abrasive effect can lead rapidly to a dramatic damage of the valve. Similar issues can arise when vessels are loaded with solid catalysts, solid adsorbents and/or solid guard beds, etc.

The present invention intends to overcome the above mentioned drawbacks by proposing an original purge/sampling system of increased security, in which the risk of blocking or damaging of the valves is considerably reduced.

A first object of the invention is a purge/sampling system for vessel, comprising a purge/sampling line equipped with a connector designed to be connected to the vessel, a first and a second flow regulation systems mounted in series on the purge/sampling line, wherein at least one injection line is connected to the purge/sampling line between the first and the second flow regulation systems, said injection line comprising connecting means to a source of cleaning fluid and at least one flow regulation device to control the flow of cleaning fluid through injection line and purge/sampling line and wherein the first and second flow regulation systems each comprise at least two control valves in series.

Such injection line permits to send a cleaning fluid through all the parts of the purge/sampling system, thus avoiding blocking of the moving parts of the system, such as those of the flow regulation systems.

The source of cleaning fluid may be pressurized bottles containing the cleaning fluid, or any appropriate storage tank. The source may also be a line issued from a unit, for example a line from a refinery unit, in which a fluid that can be used as cleaning fluid is circulating.

Optionally, such source of cleaning fluid can be part of the purge/sampling system of the invention.

Generally, the injection line comprises at least one check valve to impede the cleaning fluid, or any other fluid circulating into the purge/sampling line or injection line, to flow toward the source of cleaning fluid. Such valves may for example be chosen among flapper check valves or ball valves.

Most often, the injection line will comprise at least two check valves in series, for example two check valves, which can be the same or, preferably different from each other (for example of different technology as a flapper check valve and a ball valve), in order to limit the risk of simultaneously blocking of all check valves.

According to the invention, the first and second flow regulation systems each comprise at least two control valves in series, preferably two two-way control valves.

The use of several control valves in series is particularly useful for use of the purge/sampling system with vessel operated under high pressure. The valves in series permit to reduce progressively the pressure inside the purge/sampling line to avoid sudden depressurization of the vessel if under high pressure.

The at least two control valves in series of the first and second flow regulation systems, can be the same or, preferably different from each other (for example of different technology as a flapper check valve and a ball valve), in order to limit the risk of simultaneously blocking of all check valves.

When the vessel is used for treatment of corrosive liquids and/or for high temperature treatment, the material of valves used in the purge/sampling system of the invention will have to be chosen sufficiently resistant. Valves can for example be entirely in metal, preferably corrosion resistant metal.

The valves of the regulation systems and/or of the injection line will advantageously be air operating valves, in particular when the system is used on a vessel of a refinery for security reasons.

In a similar manner, operating valves for the purge of vessels which are loaded with solid catalysts, solid adsorbents and/or solid guard beds, etc. are subject to severe abrasion caused by said solids, which can impair operation and may result in breakdown or leakage.

Another object of the invention is a vessel comprising a purge/sampling system as described above, wherein the purge/sampling system is connected to the bottom of the vessel.

According to the invention, the vessel is a hydroconversion reactor of a refinery process, for example a hydrocarbon processing slurry reactor, or a reactor intended to contain solids, e.g. solid catalysts, solid adsorbents, solid guard beds.

The invention also concerns a method for cleaning a purge/sampling system according the invention, said purge/sampling system being connected to the bottom of a vessel, the method comprising:
(i) injecting a cleaning fluid via the injection line and purge/sampling line,
(ii) opening the first flow regulation system to allow said cleaning fluid to pass through said first regulation system for a sufficient period of time to clean said first flow regulation system and closing said first flow regulation system, wherein a separate or simultaneous opening of the valves in series of first flow regulation system is performed,
(iii) opening the second flow regulation system to allow said cleaning fluid to pass through said second regulation system for a sufficient period of time to clean said second flow regulation system and closing said second flow regulation system, wherein a separate or simultaneous opening of the valves in series of second flow regulation system is performed.

Such method permits to clean easily all the elements of a purge/sampling system, and particularly the flow regulation systems of such purge/sampling system.

The method of the invention will advantageously be performed after each use of the purge/sampling system for purging a vessel containing fluid(s) and/or solid(s), or sampling the fluid and/or solid contained in the vessel. The use of the method of the invention permits to limit corrosion of purge/sampling system by particles that may be contained in the fluid treated in the vessel or by the corrosive properties of said treated fluid. The method according to the invention can also be employed for the reduction of abrasive effect of solids onto mobile parts and close static parts of valves, even when no fluid is present but only solids. The method of the invention also permits to avoid pollution of the samples by fluid or particles eventually remaining in the system following to a previously performed purge or sampling operation.

In one embodiment, when the internal pressure of the vessel is higher than atmospheric pressure and when the first regulation system controls the flow issued from or entering inside the vessel, said cleaning fluid is pressurized at a pressure higher or equal to the internal pressure of the vessel before opening said first flow regulation system, and step (ii) is performed while the second flow regulation system is closed.

Such pressurization can be obtained by pressurization mean, for example integrated to the source of cleaning fluid, or distinct from such source.

In a variant, when the internal pressure of the vessel is higher than atmospheric pressure and when the first regulation system controls the flow issued from or entering inside the vessel, the valves in series of first flow regulation systems are preferably separately opened in order to reduce progressively the pressure within said regulation systems. In particular, the valve located on the side of the higher pressure will be opened first. The valves in series of second flow regulation systems may be simultaneously opened, preferably separately opened.

In another embodiment, when internal pressure of said vessel is atmospheric pressure, steps (ii) and (iii) are performed simultaneously.

In this case, valves in series of first and/or second flow regulation systems may be opened simultaneously, although separate opening is preferred.

Depending on the nature of the products remaining in the purge/sampling system of the invention after its use, steps (i) to (iii) of the method of the invention may be repeated in the following sequences:
a sequence (A) wherein at least one run of steps (i) to (iii) is performed using a gas as cleaning fluid,
a sequence (B) wherein at least a one run of steps (i) to (iii) is performed using a liquid as cleaning fluid,
a sequence (C) wherein at least one run of steps (i) to (iii) is performed using a gas as cleaning fluid.

Sequence (A) permits to perform a first cleaning eliminating the liquids remaining in the purge/sampling system. This sequence may be optional.

Sequence (B) permits to eliminate the particles remaining in the purge/sampling system.

Sequence (C) permits to eliminate the liquid remaining in the purge/sampling system. At the end of this sequence, the system can be considered as dried, in other words, no liquid remains in the system.

As already mentioned, the method for cleaning a purge/sampling system may be performed during or after use of the vessel in a hydroconversion process, particularly of a slurry hydroconversion process, or in a process in which the vessel contains solids, e.g. solid catalysts, solid adsorbents, solid guard beds.

When the cleaning fluid used in the method according to the invention is a gas, it will preferably be an inert gas, for example chosen among $H_2$, $N_2$, Ar, He, $CO_2$, CO, fuel gas, and C1 to C4 hydrocarbons alone or in combination.

When the cleaning fluid used is a liquid, it may be chosen among gas oils such as VGO (Vacuum Gas Oil), LCO (Light Cycle Oil), HCO (Heavy Cycle Oil), distillate, naphthas, C5 to C20 hydrocarbons alone or in combination, mineral oils, paraffins, vegetal or animal oils, crude oils including shale oils and distillation products thereof.

The invention also concerns a method for the hydroconversion of heavy residues, such as conventional vacuum distillation residue (VR) or vacuum visbroken residues (VVR), in which the heavy residues is hydroconverted in at least one hydroconversion reactor, a purge/sampling system according to the invention being connected to the bottom of this hydroconversion reactor.

By hydroconversion is meant the breakage of bonds in the molecules of hydrocarbons under hydrogen atmosphere in order to decrease or suppress coke and gas (C1-C4) formation. The breakage of bonds itself is mainly driven by temperature, the catalyst being used to promote hydrogen incorporation into the products. The term hydroconversion is used to differentiate from "hydrocracking" where the breakage of bonds is promoted by the catalyst.

The hydroconversion of heavy residues is generally operated in severe conditions, at temperature ranges from 360 to 480° C., preferably from 380 to 440°, and under a pressure of 50 to 300 bars, preferably from 100 to 200 bars.

Catalysts for hydroconversion processes are based on metals from Group IIA, IIIB, IVB, VB, VIB, VIIB, VIII, IB and IIB.

Advantageously, in the method for the hydroconversion of heavy residues, the purge/sampling system is cleaned following the method for cleaning according to the invention.

The invention is now described with reference to a non limitative figure, representing schematically a vessel equipped with an embodiment of a purge/sampling system according to the invention.

FIG. 1 represents a vessel 10 which comprises an inlet line 12 and an outlet line 14.

This vessel 10 is also equipped with a purge/sampling system comprising a purge/sampling line 16 connected to the bottom of the vessel 10.

The purge/sampling line 16 is equipped with a connector (not represented) designed to be connected to the vessel, a first 18 and a second 20 flow regulation systems mounted in series on the purge/sampling line 16.

According to the invention, the purge/sampling system also comprises an injection line 22 connected to the purge/sampling line 16 between the first 18 and the second 20 flow regulation systems.

The injection line 22 comprises connecting means (not represented) to a source 24 of cleaning fluid (gas or liquid) and at least one flow regulation device 26 to control the flow of cleaning fluid through injection line 22 and purge/sampling line 16.

In the represented example, the first 18 and second 20 flow regulation systems each comprise two two-way control valves 18a, 18b and 20a, 20b respectively.

Pressurization means (not represented) may also be provided to pressurize the cleaning fluid circulating in said injection line. Such pressurization means can be integrated to the source 24 or be separated.

In the example, the injection line 22 is also equipped with two check valves 28, 29 mounted in series. These valves can be two flapper check valves as represented, but could be two check valves of different technology.

An example of cleaning of the purge/sampling system described above is detailed here after.

After use of the purge/sampling system, a cleaning fluid is introduced in the injection line 22 via opening of valve 26. If the vessel is under a pressure higher than atmospheric pressure, the cleaning fluid is pressurized. For safety reasons, it is preferable that pressure within injection line 22 is higher than pressure within purge/sampling line 16 and vessel 10.

The cleaning fluid is then circulating trough check valves 28 and 29 to the purge/sample line 16. Opening of valves 18b and 18a permits the fluid to flow towards vessel 10, hereby cleaning valves 18a and 18b. The duration of such circulation of cleaning fluid is adapted by the operator on a case by case basis, depending the kind of waste to be removed (solids alone, finely divided electrostatic particles, solids within viscous liquid, gum deposition along the walls of lines, vessels and valves) and configuration of the purge line.

If the vessel is under pressure and operation, valves 20a and 20b will preferably be closed during cleaning of valves 18a and 18b. If not, the valves 20a, 20b may be opened simultaneously with valves 18a, 18b, although separate opening is preferred.

After cleaning of valves 18a and 18b, these valves are closed and valves 20a, 20b are opened to let the cleaning fluid flow through them for a sufficient time.

At the end of the cleaning, valve 26 of the injection line is closed, as well as all the other valves.

Off course, cleaning of valves 20a, 20b may be performed before cleaning of valves 18a, 18b.

Advantageously, the cleaning of each set of valves 18a, 18b and 20a, 20b, is ending with a cleaning gas, which permits to dry the purge/sampling system and avoid any remaining liquid in the purge/sampling system.

Preferably, in case of high temperature vessels, installation is designed with power-driven valves. Preferred power-driven valves include pneumatic-driven valves.

The invention claimed is:

1. A purge and/or sampling system for a vessel, comprising a purge and/or sampling line equipped with a connector adapted to be connected to the vessel, a first and a second flow regulation systems mounted in series on the purge and/or sampling line, wherein at least one injection line is connected to the purge and/or sampling line between the first and the second flow regulation systems, said injection line being connected to a source of cleaning fluid and at least one flow regulation device to control the flow of cleaning fluid through the injection line and the purge and/or sampling line, and wherein the first and second flow regulation systems each comprise at least two control valves in series.

2. Method for the hydroconversion of heavy residues, comprising hydroconverting the heavy residues in at least one hydroconversion reactor, wherein a purge and/or sampling system according to claim 1 is connected to the bottom of the hydroconversion reactor.

3. The method for the hydroconversion of heavy residues according to claim 2, wherein the heavy residues comprise conventional vacuum distillation residue (VR) or vacuum visbroken residues (VVR).

4. The method for the hydroconversion of heavy residues according to claim 2, wherein the purge and/or sampling system is cleaned.

5. The purge and/or sampling system according to claim 1, wherein said injection line comprises at least one check valve to impede the cleaning fluid to flow toward the source of cleaning fluid.

6. The purge and/or sampling system according to claim 5, wherein the at least one check valve(s) of the injection line are air operating valves.

7. The purge and/or sampling system according to claim 5, wherein the at least two check valve(s) of the injection line are made in corrosion resistant metal.

8. The purge and/or sampling system according to claim 5, wherein the at least one check valve includes at least two check valves, in series.

9. The purge and/or sampling system according to claim 8, wherein the at least two check valves of the injection line are valves of different technology.

10. The purge and/or sampling system according to claim 1, wherein the at least two control valves in series of the first and second flow regulation systems are valves of different technology.

11. The purge and/or sampling system according to claim 1, wherein the control valves in series of the first and second flow regulation systems are two-way control valves.

12. The purge and/or sampling system according to claim 1, wherein the control valves in series of the first and second flow regulation systems are air operating valves.

13. The purge and/or sampling system according to claim 1, wherein the control valves in series of the first and second flow regulation systems are made in corrosion resistant metal.

14. Hydroconversion reactor of a refinery process comprising a purge and/or sampling system according to claim 1, wherein the system is connected to the bottom of the reactor.

15. The hydroconversion reactor according to claim 14, wherein said reactor is a hydrocarbon processing slurry reactor or a reactor intended to contain solids.

16. Method for cleaning the purge and/or sampling system according to claim 1, the purge and/or sampling system being connected to the bottom of a vessel, wherein the method comprises providing the system of claim 1, and then:
- (i) injecting a cleaning fluid via the injection line and the purge and/or sampling line,
- (ii) opening the first flow regulation system to allow said cleaning fluid to pass through said first regulation system for a sufficient period of time to clean said first flow regulation system and closing said first flow regulation system, wherein a separate or simultaneous opening of the valves in series of first flow regulation system is performed,
- (iii) opening the second flow regulation system to allow said cleaning fluid to pass through said second regulation system for a sufficient period of time to clean said second flow regulation system and closing said second flow regulation system, wherein a separate or simultaneous opening of the valves in series of second flow regulation system is performed.

17. The method for cleaning the purge and/or sampling system according to claim 16, wherein the cleaning fluid is pressurized at a pressure higher or equal to the internal pressure of the vessel before opening said first flow regulation system when internal pressure of the vessel is higher than atmospheric pressure, and the first regulation system controls the flow issued from or entering the vessel, and step (ii) is performed while the second flow regulation system is closed.

18. The method for cleaning the purge and/or sampling system according to claim 16, wherein internal pressure of said vessel is atmospheric pressure, and steps (ii) and (iii) are performed simultaneously.

19. The method for cleaning the purge and/or sampling system according to claim 16, wherein steps (i) to (iii) are repeated in the following sequences:
- a sequence (B) wherein at least a one run of steps (i) to (iii) is performed using a liquid as cleaning fluid, and
- a sequence (C) wherein at least one run of steps (i) to (iii) is performed using a gas as cleaning fluid.

20. The method for cleaning the purge and/or sampling system according to claim 16, wherein said method is performed during or after use of the vessel in a hydroconversion process.

21. The method for cleaning the purge and/or sampling system according to claim 16, wherein said method is performed during or after use of the vessel in a slurry hydroconversion process or in a process in which the vessel contains solids.

22. The method for cleaning the purge and/or sampling system according to claim 16, wherein for cleaning the vessel the cleaning fluid is a gas chosen among $H_2$, $N_2$, Ar, He, $CO_2$, CO, fuel gas, and C1 to C4 hydrocarbons alone or in combination.

23. The method for cleaning the purge and/or sampling system according to claim 16, wherein for purging the vessel the cleaning fluid is a liquid chosen among gas oils; naphthas; C5 to C20 hydrocarbons alone or in combination; mineral oils; paraffins; vegetal or animal oils; crude oils and distillation products thereof.

24. The method for cleaning the purge and/or sampling system according to claim 23, wherein said gas oils are selected from VGO (Vacuum Gas Oil), LCO (Light Cycle Oil), HCO (Heavy Cycle Oil), and distillate.

25. The method for cleaning the purge and/or sampling system according to claim 23, wherein said crude oils comprise shale oils.

* * * * *